United States Patent [19]

Samreus

[11] Patent Number: 5,191,329

[45] Date of Patent: Mar. 2, 1993

[54] DATA ENTRY DEVICE WITH AUTOMATIC SHEET IDENTIFICATION

[76] Inventor: Philip N. Samreus, 1800 16th St., H210, Newport Beach, Calif. 92663

[21] Appl. No.: 436,080

[22] Filed: Nov. 13, 1989

[51] Int. Cl.$^5$ .......................................... H03K 17/955
[52] U.S. Cl. .................................... 341/20; 341/33; 364/709.1
[58] Field of Search .............. 341/23, 33, 22, 20; 379/354, 355; 364/709.1, 709.12, 709.15; 368/41

[56] References Cited

U.S. PATENT DOCUMENTS

| | | | |
|---|---|---|---|
| 4,379,287 | 4/1983 | Tyler et al. | 341/33 |
| 4,661,976 | 4/1987 | Basch | 379/355 |
| 4,862,497 | 8/1989 | Seto et al. | 379/355 |

FOREIGN PATENT DOCUMENTS

| | | | |
|---|---|---|---|
| 58-50036 | 3/1983 | Japan | 341/22 |
| 59-98227 | 6/1984 | Japan | 341/23 |
| 59-105164 | 6/1984 | Japan | 341/33 |
| 60-63665 | 4/1985 | Japan | 364/709.12 |

OTHER PUBLICATIONS

Lu; Japan Encounters Micro Barriers; High Technology, Feb. 1985; pp. 69-71.

Primary Examiner—Donald J. Yusko
Assistant Examiner—Michael Horabik
Attorney, Agent, or Firm—Roy A. Ekstrand

[57] ABSTRACT

A data entry device includes a plurality of base layers having electrical elements thereon. The base layers are movable with respect to each other to provide a plurality of configurations. The base layers and the conductive elements cooperate to provide electrical properties therebetween which may be sensed to determine base layer separation. In several embodiments, the base layers are arranged in pageable books or tablets.

48 Claims, 8 Drawing Sheets

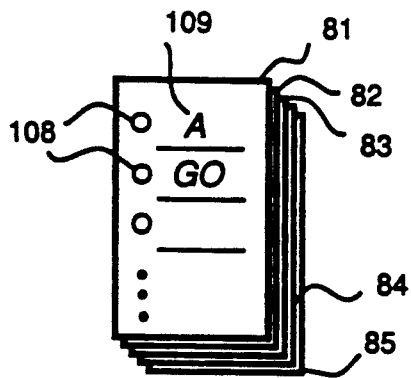
FIG. 4
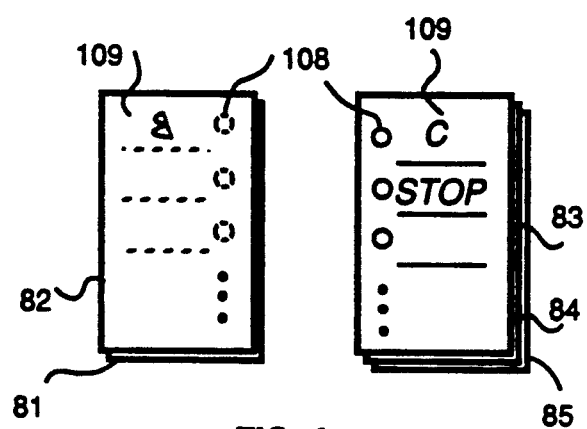
FIG. 4a
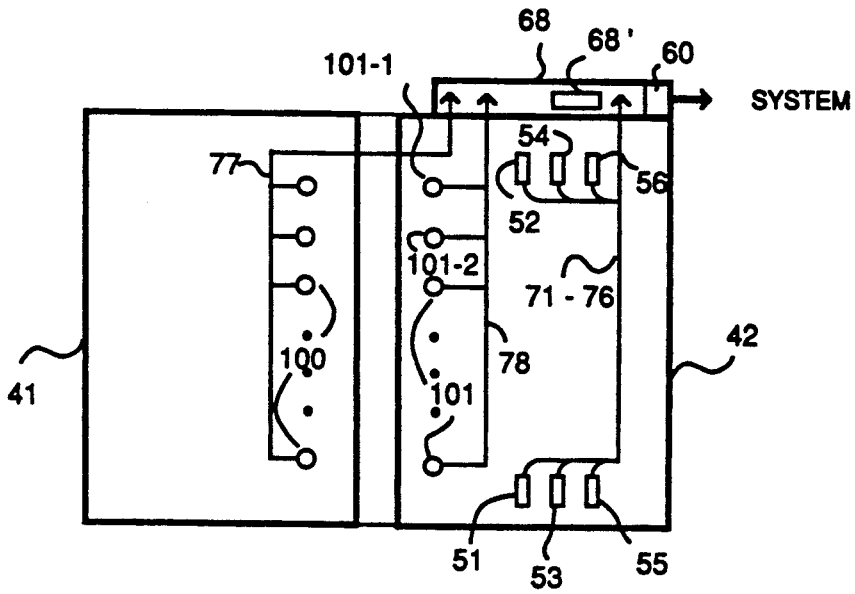
FIG. 5
KEY-REASSIGNMENT TABLE
| SELECTED | | KEY-REASSIGNMENT PARAMETERS | |
|---|---|---|---|
| LABEL | ON SHEET | SHEETS OPEN | KEY DEPRESSED |
| A | 81 | NONE | 101-1 |
| B | 82 | 81,82 | 101-1 |
| C | 83 | 82,83 | 101-1 |
| D | 84 | 83,84 | 101-1 |
| E | 85 | 84,85 | 101-1 |
| GO | 81 | NONE | 101-2 |
| STOP | 83 | 82,83 | 101-2 |
FIG. 5a

DATA ENTRY DEVICE WITH AUTOMATIC SHEET IDENTIFICATION

FIELD OF THE INVENTION

This invention is related generally to data entry devices such as keyboards and the like, and particularly to those operative with multiple overlays for manual relabeling and automatic reassignment of the data entry device keys.

BACKGROUND OF THE INVENTION

Data entry devices as a general category vary substantially in structure. However, the most known human operated data entry devices provide a plurality of depressible keys coupled to a computer system or the like. Such typical data entry devices include computer keyboards and telephone dialer keypads. Early computer keyboards included an array of alpha-numeric keys and several function keys. Each key carried a designated input data and a fixed key-top label. As the development of computer systems and data entry systems continued however, the sophistication and complexity of input information correspondingly increased. It soon became apparent to practitioners in the art that the solution to increased complexity of data input could not be met by simply increasing the number of keys. In response to this need, practitioners developed data entry devices in which the same keys were capable of being assigned multiple code reflecting the label alteration. These devices are often referred to in the art as key-reassignment and relabeling keyboards.

Such keyboards are used with a plurality of interchangeable overlays which cover the depressible keys and bear visible indications of the input codes assigned to the underlying keys. For example, an overlay for use in a restaurant may provide visual indication of the Sunday menu available. Depressing the key corresponding to an item indicated in the overlay provides a signal which the system responds to ring up the price and identification of the item. Thus, a great deal of information may be provided to the system by depressing of a single key. When an overlay is changed, the operator informs the system by loading a new program or by entering an overlay associated code.

While such multiple overlay systems provide some improvement in the flexibility and complexity of data entry devices, they are also subject to limitations in terms of the amount of input information which can be processed efficiently. To meet the further increased needs, practitioners in the art have developed multiple paged data entry devices in which a number of sheet overlays may be interchangeably used for manual relabeling and automatic key-reassignment. One such device is set forth in U.S. Pat. No. 4,661,976 entitled AUTOMATIC TELEPHONE DIALER UTILIZING AN ELECTRONIC TELEPHONE BOOK issued Apr. 28, 1987 to Basch. It comprises an automatic telephone dialer in which a plurality of sheets are supported upon a common base. Each sheet includes a plurality of telephone listings. An optical sensing array detects the open sheets of the sheet array. The information indicating the open sheets is provided to the system for key-reassignment.

A somewhat similar device is set forth in the February 1985 issue of the publication entitled HIGH TECHNOLOGY in an article at page 69 thereof written by Cary Lu.

While the foregoing described prior art devices provide key-reassignment and relabeling for data entry devices, they are subject to generally several disadvantages. It has been found for example that such devices tend to be larger than necessary to accommodate one optical detector for each sheet. In addition, the optical detectors and their high power consumption render the production of slim design or pocket model data entry devices impractical. Furthermore, substantial limitations arise as to the number of pages which can be accommodated and sensitivity of the optical devices to page damaged and ambient light.

SUMMARY OF THE INVENTION

Accordingly, it is a general object of the present invention to provide an improved data entry device. It is a further object of the present invention to provide an improved data entry device which may be readily fabricated as a data entry book and which may be easily and inexpensively constructed.

In accordance with the present invention, there is provided an automatic key-reassignment and manual relabeling data entry device in which plurality of sheets are assembled in a data entry device wherein each sheet supports an electrical element. Means are provided which support the sheets within the device such that the electrical elements of the sheets overlie each other and form a multiple element capacitor. Connection means are provided between the electrical elements and the electrical interface where the capacitance between the sheets may be measured to determine the open sheets of the device.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIGS. 4 and 4a set forth a plurality of data sheets for the embodiment of the present invention shown in FIG. 3;

FIG. 5 sets forth a portion of the embodiment of the present invention data entry book shown in FIG. 3;

FIG. 5a sets forth a Key-Reassignment Table used with the present invention.

DESCRIPTION OF THE PREFERRED EMBODIMENTS

Figure 1:
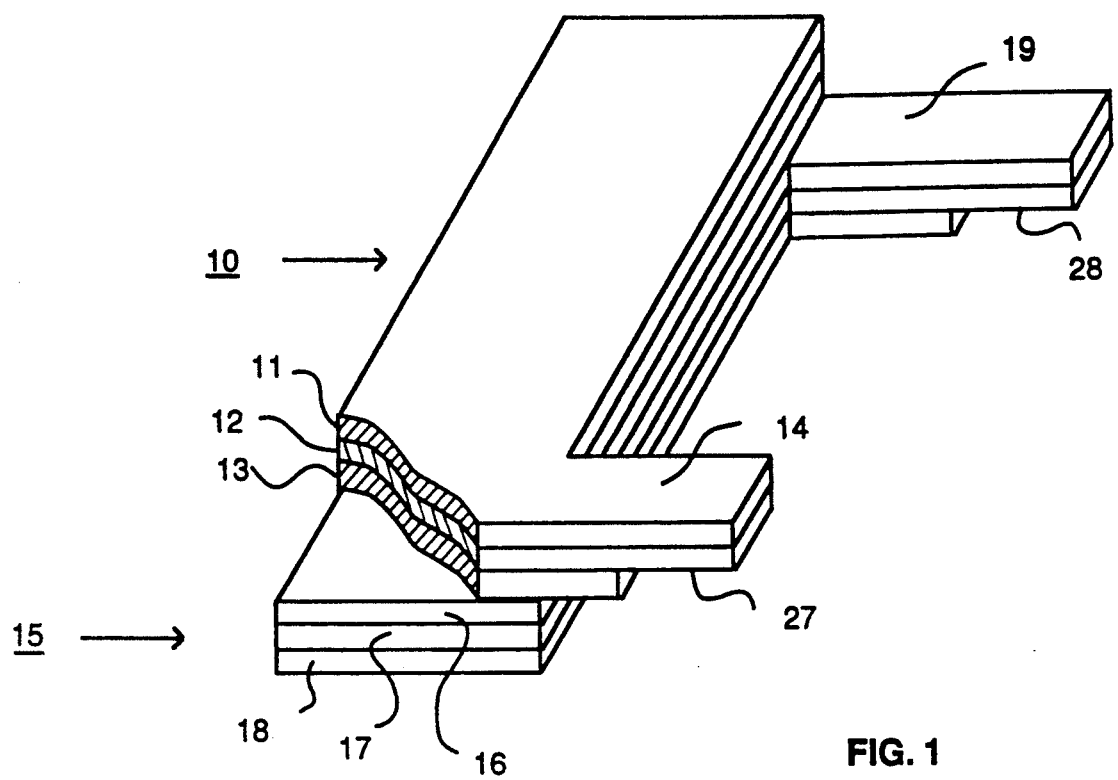
FIG. 1 sets forth a perspective view of a pair of typical data entry book sheets constructed in accordance with the present invention.

FIG. 1 sets forth the perspective view of a pair of exemplary sheets generally referenced by numerals 10 and 15 constructed in accordance with the present invention data entry book. Sheet 10 includes a base layer 11 and a conductive layer 12 covered with an insulative layer 13. Base layer 11 is formed of an insulative material such as paper or plastic or other suitable materials and insulative layer 13 may be formed of any convenient sealing material such as plastic or the like. While conductive layer 12 may be formed of any number of conductive coatings it has been found practical to use a conventional binder blended with metallic powder or carbon black or graphite. In addition, other conductive and semi-conductive coatings or layers may be used. Conductive layer 12 and insulative layer 13 may be fabricated using any of the presently available techniques. Sheet 10 further defines an outwardly extending tail 14. In accordance with an important aspect of the present invention set forth below in greater detail, a portion of the conductive layer 12 in the tail area is electrically exposed and defines the sheet terminal 27 available for electrical connection to an external electrical element. In addition, while the embodiments set forth herein use single conductive or semi-conductive areas on each sheet, it should be understood that the sheets shown may each support multiple conductive and/or semi-conductive areas each having a separate coupling tail without departing from the invention.

Sheet 15 is of similar construction to sheet 10 and includes a base layer 16, a conductive layer 17, an insulative layer 18, an outwardly extending tail 19 and a sheet terminal 28. For reasons set forth below in greater detail, it should be noted that tails 14 and 19 of sheets 10 and 15 are spaced apart by a sufficient distance to avoid contact between any exposed portions of conductive layers 12 and 17 and to minimize the parasitic capacitance therebetween. Tail 19 is made longer than tail 14 for reasons shown in FIG. 3.

Sheets 10 and 15 are superimposed and thus comprise a parallel plate capacitor whose capacitance is defined by the overlapping area of conductive layers 12 and 17, the distance between the same layers which is the thickness of base 16 (sheet 15) plus the thickness of insulating layer 13 (sheet 10), and finally defined by the dielectric constant of the base material and the insulating material. It will be apparent to those skilled in the art that deleting the insulative layer will increase the capacitance.

While the sample structures of sheets 10 and 15 set forth in FIG. 1 show conductive layers and insulative layers which are virtually coextensive with base layers 11 and 16, it will be understood by practitioners in the art after reading the descriptions which follow that the conductive and insulative layers of sheets 10 and 15 need not be coextensive with base layers 11 and 16 respectively. It should be noted that tails 14 and 19 can be deleted and replaced by leads or wires electrically bonded to conductive layers 12 and 17. Conductive layers 12 and 17 represent electrical elements. They can take different forms and functions, as explained below. Within the scope of this invention, sheets 10 and 15 are also used as an element of a book and as such they have the quality of being writable, printable, readable on the both sides. Writing paper such as typical "Bond" paper as well as some plastic films satisfy the above requirements. For specific applications, sheets 10 and 15 may take different forms For example, they may form plastic pockets for storage of index cards and the like.

Figure 2:
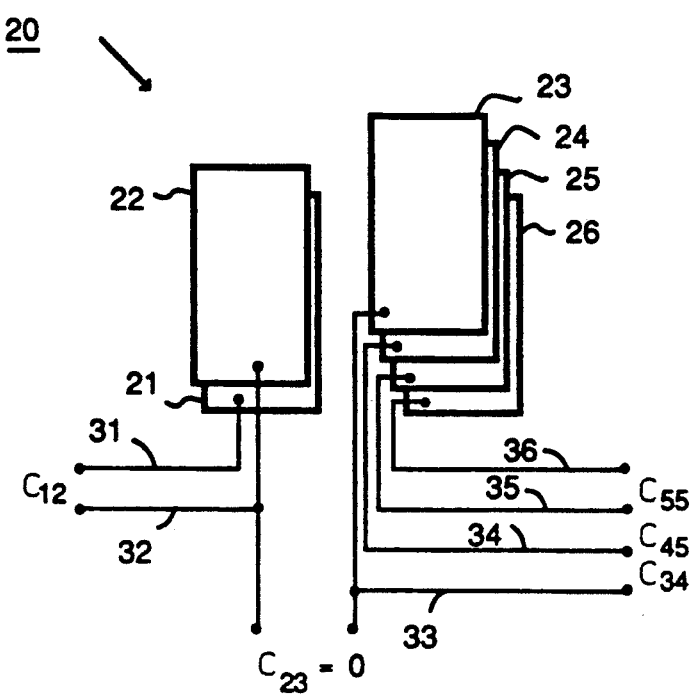
FIG. 2 sets forth a pictorial diagram of a plurality of data entry book sheets.

FIG. 2 sets forth a simplified view of an array of sheets generally referenced by numeral 20 together with appropriate interconnections. It should be understood that FIG. 2 is a simplified drawing used to explain the basic operative principle of the present invention data entry book. Therefore, reference is invited to the figures and descriptions which follow for more detail understanding of the construction of the present invention data book. Sheet array 20 includes a plurality of generally planar sheets 21, 22, 23, 24, 25 and 26. Sheets 21 through 26 should be understood to be constructed in general accordance with sheets 10 and 15 of FIG. 1 in that they comprise individual base layers which support conductive material and insulative material arranged in accordance with FIG. 1. Sheet 21 further includes a conductive tail or lead 31 which should be understood to form a conductive electrical connection to the conductive layer of sheet 21. Similarly, sheets 22 through 26 include connecting leads 32 through 36 respectively which form corresponding electrical connections to the individual conductive layers of sheets 22 through 26 respectively. In the position shown in FIG. 2, sheets 21 and 22 have been "turned" or paged over from the remainder of sheets 23 through 26. Thus, FIG. 2 depicts the configuration of sheets 21 through 26 which arises when the present invention data entry book is open to show sheets 22 and 23, for example, the sheets are physically and visibly accessible to the operator. In this position, conductive layers of sheets 21 and 22 produce a capacitance C12 therebetween which may be detected or measured between connecting leads 31 and 32. Similarly, the conductive layers of sheets 23 through 26 produce a series of intersheet capacitances which may be measured or detected between leads 33 through 36 respectively. In contrast however, the separation between sheets 22 and 23 provides virtually no capacitance therebetween and thus the capacitance C23 measured or detected between leads 32 and 33 is virtually zero.

Thus in the arrangement shown in FIG. 2 and in accordance with an important aspect of the present invention, the measurement of intersheet capacitance between connecting leads 31 through 36 permits the determination of the relative position of sheets 21 through 26 due to the occurrence of the near zero capacitance between sheets 22 and 23. Simply stated, the zero intersheet capacitance locates the open sheets of sheet array 20. It will be apparent to those skilled in the art that despite careful structures and methods of fabrication set forth below to minimize the stray capacitances produced between connecting leads 31 through 36 and the open sheets 22 and 23, some unwanted capacitance is inevitable. Accordingly, and in accordance with the preferred fabrication of the present invention, the relative areas of conductive materials and other capacitance determining parameters of sheets 21 through 26 are selected to provide capacitances between overlying pages which are substantially greater than the unwanted capacitances within the data entry book. It should be noted that the arrangement of FIGS. 1 and 2 can be incorporated in different embodiments. In the examples to follow, similar sheet arrays are included in a loose-leaf binder, a notebook and the like.

Figure 3:
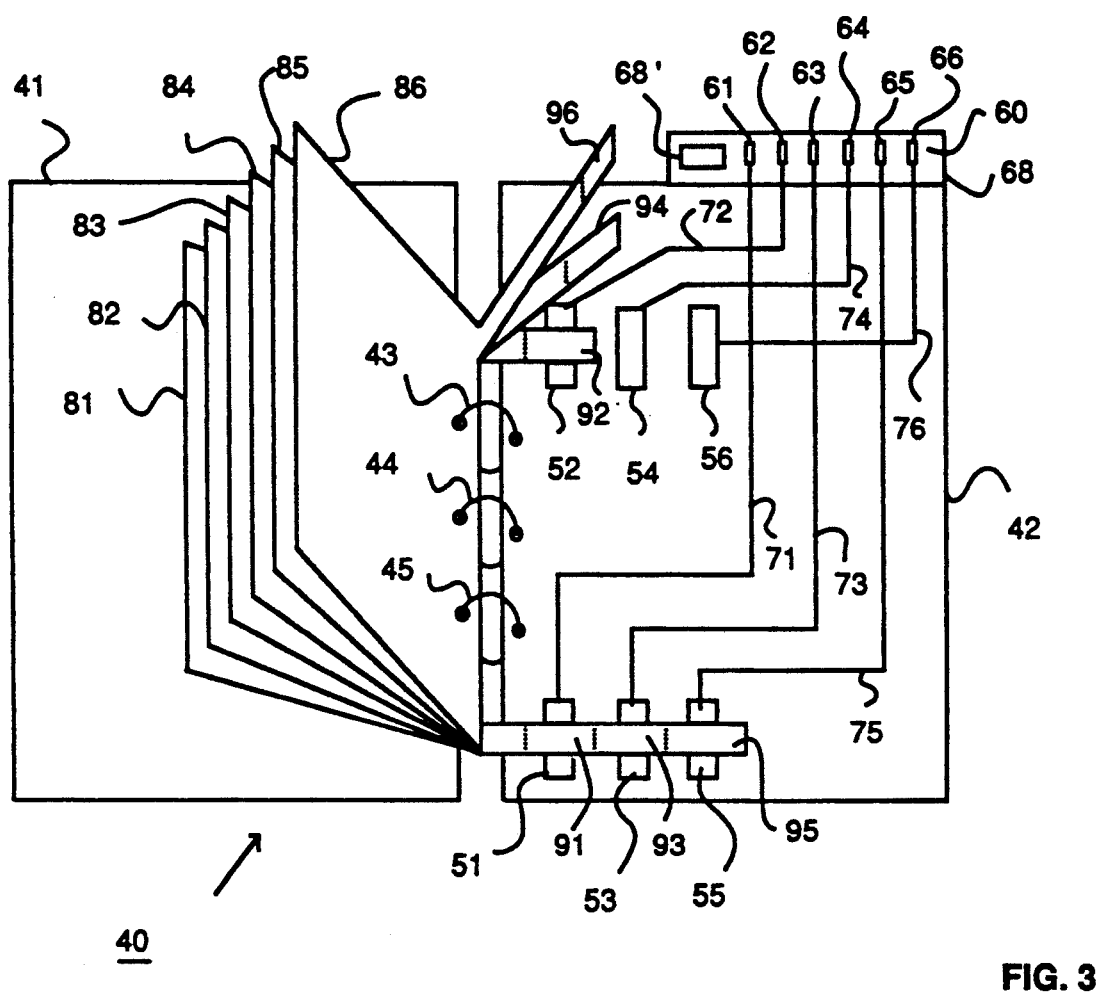
FIG. 3 sets forth a perspective view of a data entry book constructed in accordance with the present invention.

FIG. 3 sets forth a typical data entry book generally referenced by numeral 40 and constructed in accordance with the present invention. Data entry book 40 includes a pair of book covers 41 and 42. Covers 41 and 42 are movably joint by a trio of binder rings 43, 44 and 45. Cover 42 supports a plurality of connecting pads 51 through 56. To minimize parasitic capacitances, pads 51, 53 and 55 are arranged along the lower edge of cover 42 while pads 52, 54 and 56 are arranged in a row near the upper edge of cover 42. Cover 42 supports an electrical interface 68 which includes book connector 60 with connector pins or fingers 61 through 66 arranged along the upper edge. An electro-optical display (not shown) and electrical components 68 are also typically included in the electrical interface. A plurality of conductors 71 through 76 provide electrical connections between fingers 61 through 66 and connecting pads 51 through 56 respectively. A plurality of sheets 81 through 86 constructed in accordance with sheets 10 and 15 shown in FIG. 1 are movably supported upon binder rings 43 through 45 by a plurality of conventional binder apertures Sheets 81 through 86 define extending tails 91 through 96 respectively in further accordance with the structure shown in FIG. 1. Accordingly, sheet 86 defines an outwardly extending tail 96 having a length sufficient to reach connecting pad 56. Correspondingly, sheet 84 defines an outwardly extending tail 94 having a length sufficient to reach connecting pad 54 and sheet 82 defines an outwardly extending tail 94 having a length sufficient to reach connecting pad 52. It should be noted that tails 92, 94 and 96 each defines a sheet terminal similar to sheet terminals 27 and 28 of sheets 10 and 15 in FIG. 1 Thus, the overlap of tail 96 upon connecting pad 56 provides an electrical connection between the conductive layer of sheet 86 and pad 56. Similarly, the sheet terminal on tail 94 provides an electrical connection between pad 54 and the conductive layer of sheet 84. Finally, the sheet terminal on tail 92 provides an electrical connection between the conductive layer of sheet 82 and connecting pad 52. In operation, tails 92, 94, and 96 are folded downwardly and pressed against cover 42, thus, electrical connections are established between the conductive layers of sheets 82, 84 and 86 and the connecting pads 52, 54 and 56.

In similar fashion, sheets 81, 83 and 85 define outwardly extending tails 91, 98 and 95 respectively, which, in accordance with the foregoing description, provide electrical connection between pads 51, 53, and 55 and the conductive layers of sheets 81, 83 and 85 respectively. The capacitances between sheets 81 through 86 may be readily measured at connector fingers 61 through 66 of book connector 60. In data entry devices utilizing a greater number of sheets and corresponding electrical connection lines, electrical interface 68 may include a parallel to serial converter, or a multiplexor, or an encoder (not shown) to reduce the number of external connections required. In accordance with an important aspect of the present invention, the data entry book shown in FIG. 3 may be paged such that sheets 81 through 86 overlie each other and are stacked upon cover 41. Alternatively, sheet 86 may be "paged over" to overlie cover 42 in which case sheet 86 is separated from sheets 85 through 81. In such case, examination of the capacitances between sheets 81 through 86 at connector fingers 61 through 66 provide a zero capacitance between sheets 85 and 86 and thus indicates that the data entry book is open to sheets 85 and 86. By similar examination, the alternative positions of sheets 81 through 86 may be determined by the presence of zero capacitance between any two consecutive sheets of the data entry book. Absence of zero capacitance indicates that all sheets (the book) are (is) closed. It should be noted that cover 41 can bear an electrical element, or capacitor plate connected to a connector finger, permitting identification of front cover relative position.

FIG. 5 sets forth covers 41 and 42 with pages 81 through 86 and binder rings 43 through 45 removed, however, depressible key arrays 100 and 101 are added. Cover 42 supports a plurality of depressible keys 101 arranged in an equally spaced row near the inner edge of cover 42. The first two keys are marked 101-1 and 101-2. Correspondingly, cover 41 supports a second plurality of keys 100 arranged along the inner edge of cover 41. Multiple conductor sets 77 and 78 provide electrical connection from keys 100 and 101 to book connector 60. Via book connector 60, electrical contact with an external system (not shown) is provided.

A major objective of the present invention is relabeling and reassignment of data entry keys. In order to relabel the key 101-1 in FIG. 5, for example, this invention provides solutions exemplified in FIG. 4 with a five-sheet array 81 through 85 as a part of a book 40. The sheets carry alpha-numeric, graphical, or other type of information 109 as a label/symbol which is readable or in other way recognizable by the operator. In operation, the five-sheet array 81 through 85 is assembled with the data book parts shown in FIG. 5. The label for key 101-1 changes when a sheet is turned to expose the next or the previous sheet. This is illustrated in FIG. 4 where sheet 81 is on top of sheets 82 through 85 and displays the letter "A" as a label/symbol 109 for key 101-1. The label changes to "B" on sheet 82 and to "C" on sheet 83 as illustrated in FIG. 4a. It should be noted that labels A, B and C are associated with key 101-1. The second label "GO" on sheet 81 is associated with the second key 101-2. This label changes to "STOP" on sheet 83. The labels used in this example and their locations are listed in FIG. 5A KEY-REASSIGNMENT TABLE, column LABEL. A mark 108 next to each label/symbol 109 coincides with an underlying key in operational position and indicates the area to be depressed by the operator to actuate that underlying key. In this way, the present invention makes it possible to incorporate a plurality of interchangeable labels, for example, 20, 50 or more labels on top of an entry key and in addition provides each label with ample space for printed or handwritten information to assist the operator and speed up the data entry. Another major objective of the invention is to provide the system information as to the sheet bearing the selected label. The arrangement described in connection with FIG. 3 provides zero-capacitance information permitting identification of the open sheet(s) bearing the selected label(s). It should be noted that in addition to zero-capacitance information, the arrangement of FIG. 3 provides alternative information for open page identification. This occurs when the operator touches the open sheet to depress the underlying key. His body capacitance and resistance (to ground) alter the sheet's own capacitance and resistance. This new electrical condition is measurable at the respective connector finger. With known in the art methods, the touched sheet is identified. A further alternative arrangement for open sheet identification is disclosed in connection with FIG. 17.

When a label is selected and the underlying key is actuated, information is provided for the key number and the opened sheet numbers. In FIG. 5A, Key-Reassignment Table, line one reflects the events taking place when the operator strikes label "A" on sheet 81. The book is sending data indicating that "NONE" sheets were open and the depressed key was number 101-1. Accordingly, the system assigns key number 101-1, label "A". Further, the table indicates that any one of the aligned labels—"A, B, C, D, E" can be assigned to key 101-1.

Summarizing, the sheets as visual information bearer on top of the keys provide the relabeling capability and the same sheets as electrical elements in cooperation with the keys provide the key-reassignment capability. It would be apparent to those skilled in the art that keys 100 and 101 need not be supported beneath sheets 80 through 85, but may be located at any convenient place.

Figure 6:
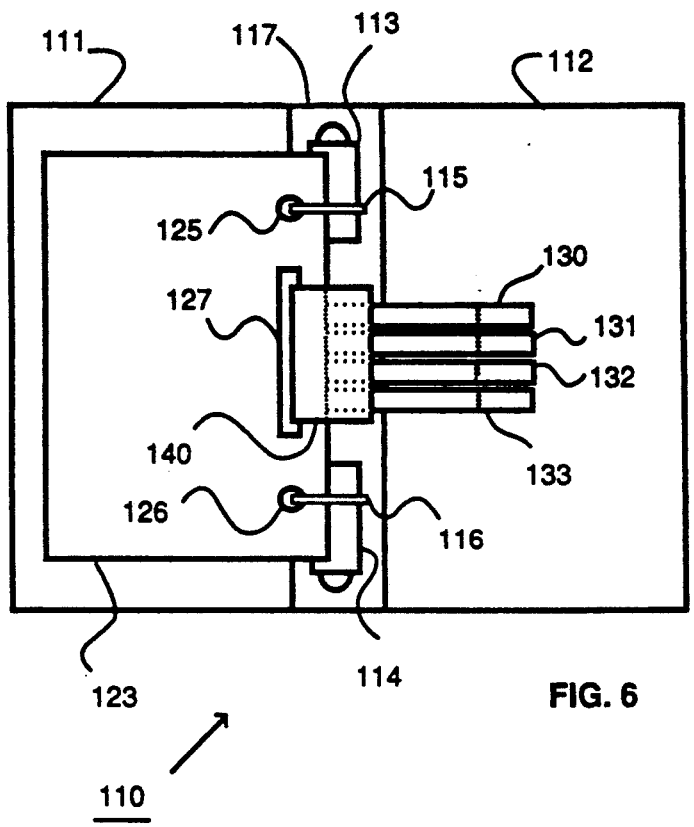
FIG. 6 sets forth an alternate embodiment of the present invention data entry book.

FIG. 6 sets forth an alternate embodiment generally referenced by numeral 110 and having a pair of covers 111 and 112 joint by a spine 117. In accordance with conventional book fabrication covers 111 and 112 are pivotally attached to spine 117 and may be opened and closed accordingly. A pair of binder assemblies 113 and 114 constructed in accordance with conventional fabrication techniques are secured to and supported upon spine 117. Binder 113 includes a split binder ring 115 while binder 114 includes a split binder ring 116. The rings are of plastic or metal coated with an insulative layer. A plurality of data entry book sheets 120 through 123 are received upon binder rings 115 and 116 and stacked upon cover 111. Sheet 123 defines a pair of apertures 125 and 126 receiving binder rings 115 and 116 respectively to secure sheet 123 within data entry book 10. A slot 127 extends parallel to the interior edge of sheet 123. While not visible in FIG. 6 sheets 120, 121 and 122 are similar to sheet 123 and supported beneath sheet 123 in the position shown in FIG. 6. Sheet 123 defines an extending tail 133 which extends laterally from the interior portion of sheet 123 and is conductibly coupled to a connecting pad (not shown) in cover 112 in a similar fashion to the embodiment in FIG. 3. Correspondingly, data entry book sheets 120 through 122 define extending tail portions 130 through 132 respectively. Tails 130 through 132 form similar conductive attachments to the interior of cover 112 to provide electrical connections. In accordance with the invention, sheets 120 through 123 include similar conductive and insulative layers to that set forth above and are operative in the same manner as the alternate embodiments described above. A generally cylindrical tail cover 140 is secured to spine 117 to provide a protective overlay for tails 130 through 133.

In operation, data entry book 110 functions in much the same manner as the above described embodiments. The primary difference in the embodiment of FIG. 6 from those described above is the location of tails 130 through 133 near the center of sheets 120 through 123 and a protective tail cover 140.

Figure 7:
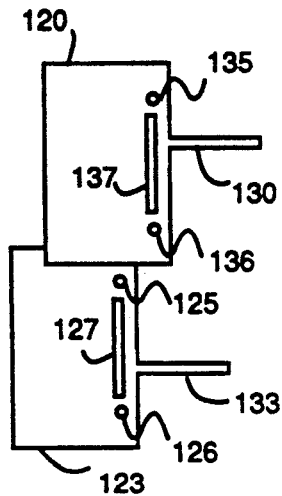
FIG. 7 sets forth exemplary data sheets for the embodiment of the present invention data entry book shown in FIG. 6.

FIG. 7 sets forth sheets 120 and 123 of the embodiment of FIG. 6 in greater detail.

Figure 8:
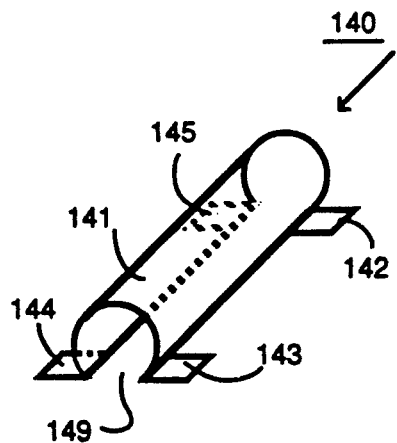
FIG. 8 sets forth a perspective view of the sheet tail cover for the embodiment of the present invention data entry book shown in FIG. 6.

FIG. 8 sets forth tail cover 140 of insulating material which as can be seen comprises a generally cylindrical member 141 having a plurality of outwardly attachments tabs 142 through 145 inclusive. Tabs 142 through 145 are attached to spine 117.

Figure 9:
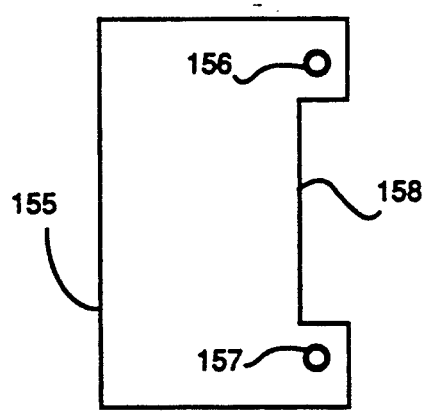
FIG. 9 sets forth a passive insert suitable for use with the embodiment of FIG. 6.

Split binder rings 115 and 116 allow for quick removal/insertion of sheets in the data book. FIG. 9 sets forth an insert sheet 155 with two apertures 156 and 157, and a notch 158. Sheet 155 may be removably engaged to the data book by using only split rings 115 and 116. Notch 158 provides clearance between edge of sheet 155 and tail cover 140 to permit insert sheet 155 to be freely moved upon split rings 115 and 116.

It should be noted that insert sheet 155 is made of insulative material and does not carry any conductive layer. Its presence between sheets 122 and 123 will change the intersheet capacitance therebetween. Insert sheet 155 can provide supporting visual information. Another type of insert sheet which does not influence the intersheet capacitance is disclosed in FIG. 16.

Figure 10:
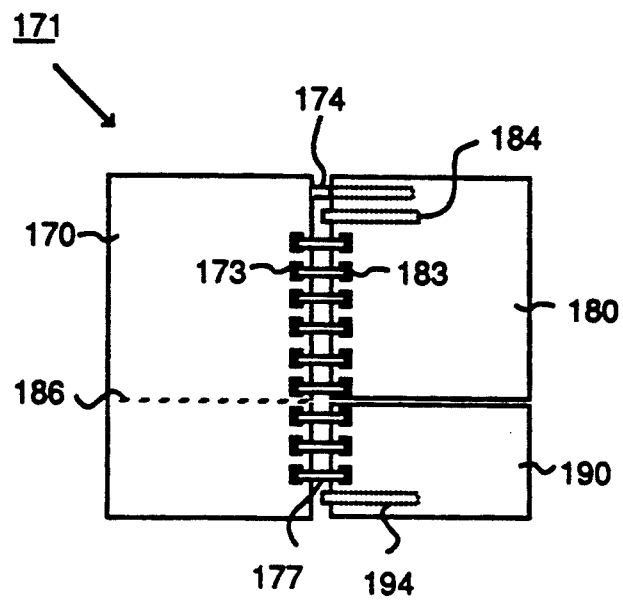
FIG. 10 sets forth an alternate embodiment of the present invention data entry book.

FIG. 10 sets forth an alternate embodiment of the present invention data entry book with spiral binding and sheet segments generally referenced by numeral 171. A data sheet 170 defines a plurality of apertures 173 positioned along the interior edge to receive spiral wire 177. Data sheet 170 includes an extending tail 174. A segment data sheet 180 defines apertures 183 which receive spiral wire 177. A second segment data sheet 190 completes the remaining portion to provide the equivalent of full sheet such as sheet 170. Segment data sheet 190 defines apertures 193 along the interior edge to receive spiral wire 177. In accordance with an important advantage of the embodiment shown in FIG. 10, data sheets 170, 180 and 190 are individually movable with respect to book covers (not shown) and the remainder of data sheets to provide partial paging of the data sheets. For example, segment data sheet 190 may be individually moved apart from segment data sheet 180 to overlie a portion of sheet 170 as indicated by dash line 186. Similarly, sheet 180 may be moved with respect to sheet 190 to overlie data sheet 170 as is also indicated by dash line 186. Data sheet 180 includes a tail 184. Similarly, sheet 190 defines an extending tail 194. It should be understood that while not shown in FIG. 10, tails 174, 184 and 194 are electrically connected to a book connector and sheets 170, 180 and 190 are formed in the same manner as sheets 10 and 15 in FIG. 1, and accordingly each define a base layer, a conductive layer, and an insulative layer. Specifically, it should be understood that data entry book 171 supports a plurality of depressible keys in the book covers and functions substantially in accordance with the above-described operation of data entry book 40 in FIGS. 3, 4 and 5.

Figure 11:
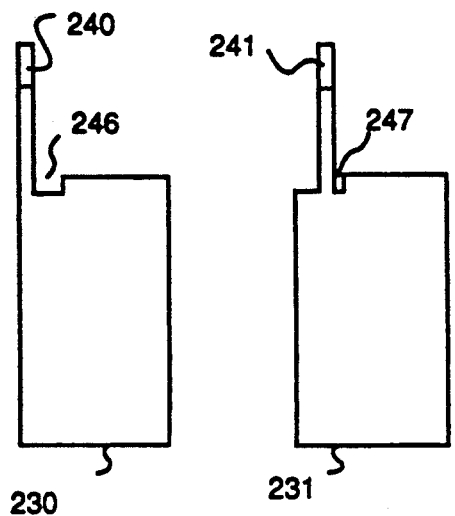
FIG. 11 sets forth a pair of sample sheets used in the embodiment of the present invention data entry book of FIG. 12.
Figure 12:
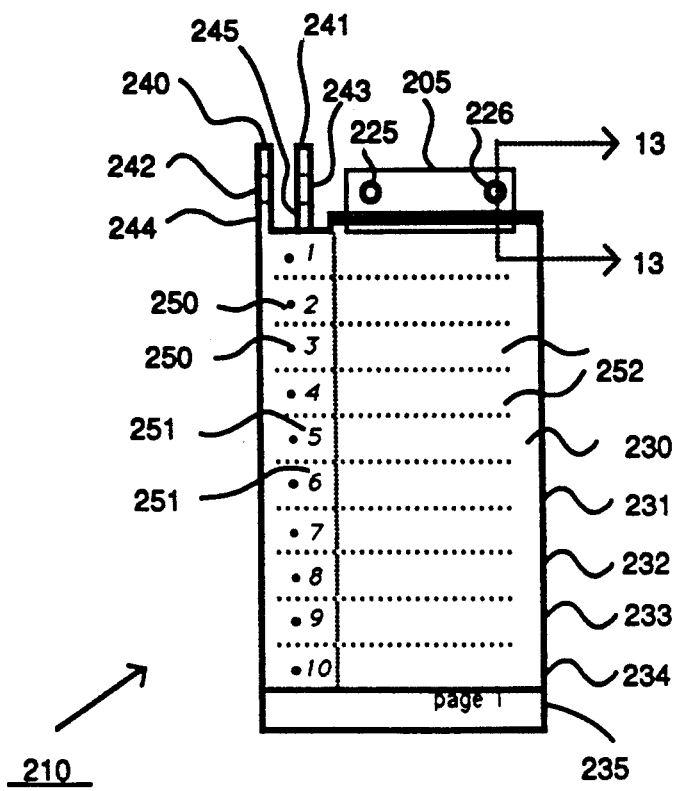
FIG. 12 sets forth a plurality of data sheets assembled for use with the embodiment shown in FIG. 15.
Figure 14:
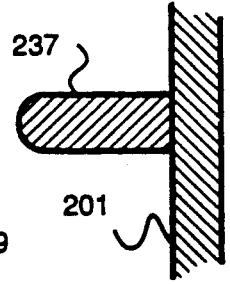
FIG. 14 sets forth a partial section view of the data entry book of FIG. 15 taken along section lines 14—14 in FIG. 15.
Figure 13:
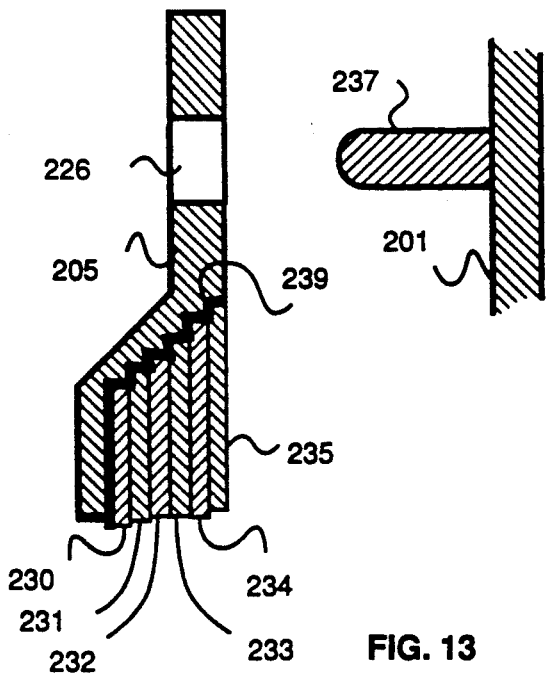
FIG. 13 sets forth a partial section view of assembled data sheets of FIG. 12 taken along section lines 13—13 in FIG. 12.

FIGS. 11, 12 and 13 set forth a label tablet 210 which is a collection of data sheets 230 through 235 glued together at one edge. The label tablet 210 is removably attachable to base 201 of FIG. 15. As set forth in FIG. 12, the label tablet 210 includes a plurality of data sheets 230 through 235 arranged in a stack. Data sheet 230 includes an upwardly extending tail 240 and defines a notch 246 along its upper edge (better seen in FIG. 11). Sheet 231 is positioned beneath sheet 230 and defines an upwardly extending tail 241. Sheet 231 defines a notch 247 generally coincident with notch 246. It should be noted that tail 241 of sheet 231 is spaced inwardly from tail 240 of sheet 230 to reduce intertail parasitic capacitance. Sheet 232 which underlies sheet 231 defines an upwardly tail 242 and a notch similar to notch 246 of sheet 230. Tail 242 underlies tail 240 and is of reduced length with respect to tail 240. Sheet 233 underlies sheet 232 and defines a notch similar to notch 247 of sheet 241 and an upwardly extending tail 243 which underlies and is shorter than tail 241 of sheet 231. Similarly, sheet 234 underlies sheet 233 and defines a notch similar to notch 246 and an upwardly extending tail 244 which underlies tails 242 and 240 and is shorter than tail 242. Finally, sheet 235 underlies sheet 234 and defines a notch similar to notch 247 and an upwardly extending tail 245 which underlies tails 241 and 243 and is shorter than tail 243. Summarizing, the tails of sheets 230 through 235 progress with alternating sheets having offset tails and successively shorter lengths of tails to provide the structure shown in FIGS. 11 and 12. It should be noted that the notches 246, 247 etc. act as strain relief in tail - sheet junction. The sheets 230 through 235 are glued together by means of a strip 205 as shown in the cross sectional view in FIG. 13. The glue holds the upper edges of all sheets and a small portion 239 of the front surface of the sheets. Strip 205 comprising a generally planar member, the structure of which is set forth in greater detail in FIGS. 12 and 13, defines a pair of apertures 225 and 226 which receive pins 236 and 237 respectively extending upwardly from base 201 (seen in FIGS. 14 and 15). Strip 205 secures the upper edges of sheets 230 through 235 to form a tablet like binding which maintains sheets 230 through 235 in the position shown in FIG. 12. It should be noted that sheet 230 bears a plurality of ruled spaces 252 arranged across the sheet. In addition, sheet 230 supports a plurality of visual information legends such as the numbers 251 shown together with visually marked key-press indicia 250. Thus sheet 230 is provided with a plurality of spaces 252 upon which the visually imparted information relating to the particular key-press indicia is available to the operator. It should be understood that sheets 231 through 235 bear similar markings to those shown for sheet 230, and that sheets 230 through 235 are constructed in accordance with sheets 10 and 15 shown in FIG. 1.

Figure 15:
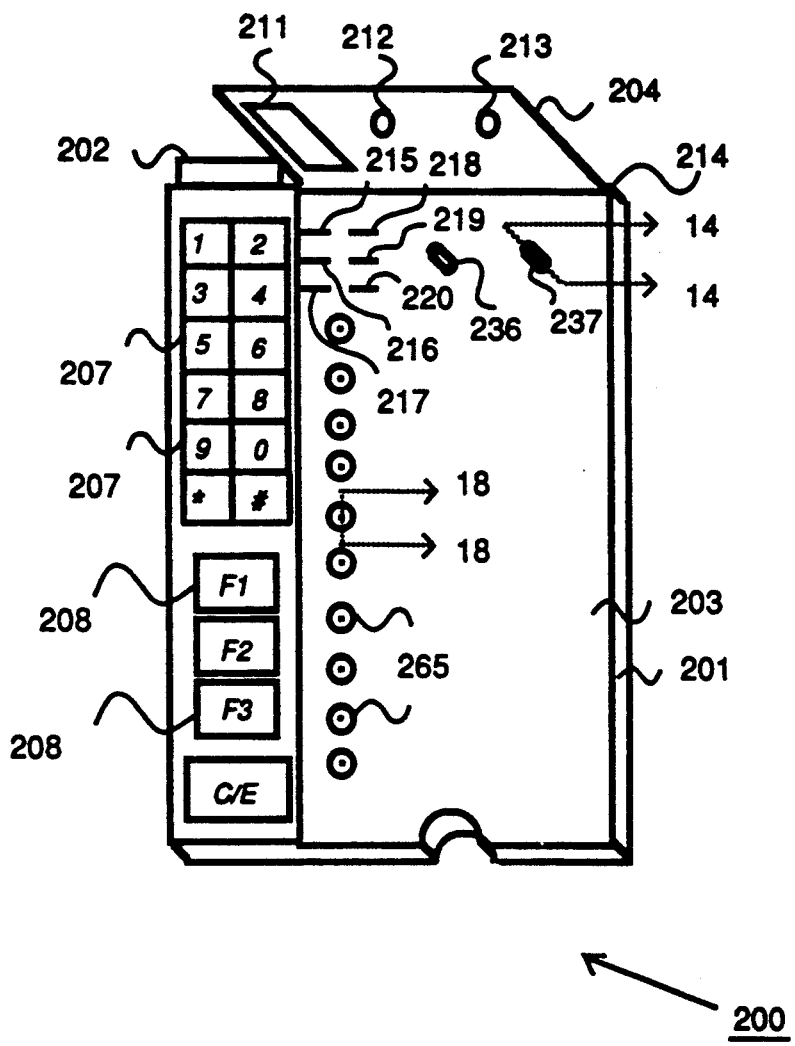
FIG. 15 sets forth a perspective view of an alternate embodiment of the present invention data entry book.

FIG. 15 sets forth a data entry table support referenced by numeral 200. A generally planar base 201 defines a planar flexible cover 203 which supports a plurality of connecting pads 215 through 220. Connecting pads 215, 216 and 217 are arranged in an evenly spaced vertical row, while connecting pads 218, 219 and 220 are arranged in a similar row parallel to pads 215 through 217. It should be understood that in accordance with the above-described structure, connecting pads 215 through 220 are coupled to conductors (not shown) which provide electrical connection to tablet support connector 202 for coupling to outside devices. It should be noted that in accordance with the above-described fabrication techniques, tails 240, 242 and 244 are electrically connected to connecting pads 215, 216 and 217 respectively. Similarly, tails 241, 243 and 245 are electrically connected to connecting pads 218, 219 and 220 respectively. Accordingly, the conductive layers of sheets 230 through 235 are individually connected to pads 215 through 220. A generally planar cover plate 204 is attached to base 201 at a hinge 214. Hinge 214 permits cover plate 204 to be pivotally rotated from the open position shown in FIG. 15 to a close position in which cover plate 204 overlies strip 205 and tails 240 through 245. Cover plate 204 further defines a pair of apertures 212 and 213 spaced upon cover 204 to receive the extensions of pins 236 and 237 extending beyond strip 205. Thus the cooperation of apertures 212 and 213 with pins 236 and 237 is operative to secure cover 204 in the close position. In addition, a resilient pad is secured to the underside of cover 204 and positioned thereon such that resilient pad 211 overlies the connections of tails 240 through 245 upon connecting pads 215 through 220. Thus in the closed position, the resilient force provided by resilient pad 211 maintains a short contact between tails 240 through 245 and their respective connecting pads 215 through 220. In accordance with an important aspect of the embodiment shown in FIG. 15, the rotation of cover 204 to the open position permits the easy removal and replacement of label tablet 210. A plurality of depressible keys 265 are arranged in a vertical row across flexible cover 203 of base 201. The structure of keys 265 is set forth below in greater detail. However, suffice it to note here that virtually any structure may be utilized without departing from the spirit and scope of the present invention. With simultaneous reference to FIGS. 12 and 18, it should be noted that keys 265 are spaced and arranged upon or beneath flexible cover 203 to underlie key indicia 250 of data sheets 230 through 235. Thus depressing the selected key indicia 250 on data sheets 230 through 235, results in depressing the underlying one of keys 265. Base 201 further supports a plurality of numeric keys 207 together with a plurality of function keys 208. Keys 207 and 208 provide for additional input of information and functional configuration. As shown, they are not relabelable nor reassignable. It will be apparent to those skilled in the art that keys 265 need not be supported upon or beneath label tablet 210 but may instead be located at any convenient place.

Figure 16:
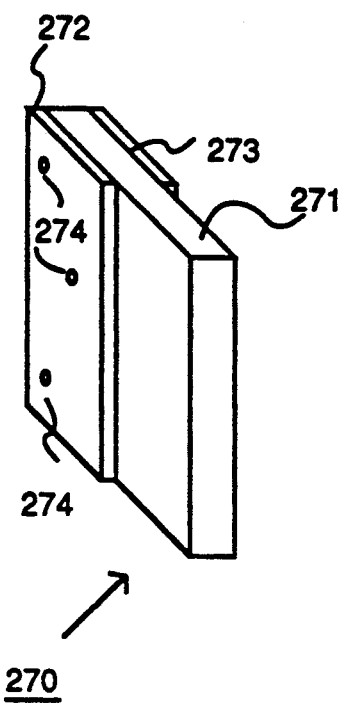
FIG. 16 sets forth a perspective view of a passive insert sheet compatible with the present invention data entry book.

FIG. 16 sets forth a perspective view of a sheet generally referenced by numeral 270 which includes an insulative base 271, a conductive layer 272 on one side of the base and a conductive layer 273 on the other side. Conductive layers 272 and 273 are electrically connected by a plurality of connecting elements 274. Thus the conductive layers 272 and 273 of sheet 270 are electrically continuous. In accordance with the invention and for a specific application, sheet 270 is made to size and shape of sheet 155 in FIG. 9 and is inserted between sheets 122 and 123 in FIG. 6 instead of sheet 155. Because conductive layers 272 and 273 are conductively coupled by connecting element 274 and remain free of any external electrical connection, the resulting capacitance produced by the sheets 122 and 123 in FIG. 6 remains substantially the same as that achieved without sheet 270 inserted therebetween. Thus in accordance with an important aspect of the present invention, any number of insert sheets constructed in accordance with the structure shown in FIG. 16 may be inserted within the array of data sheets in the present invention data entry book without substantial change in the resulting capacitances between data sheets. Sheet 270 is a double sided conductive layer coated sheet and can also be applied as a data sheet such as sheet 10 of FIG. 1 or any other disclosed herein. An example is set forth below.

Figure 17:
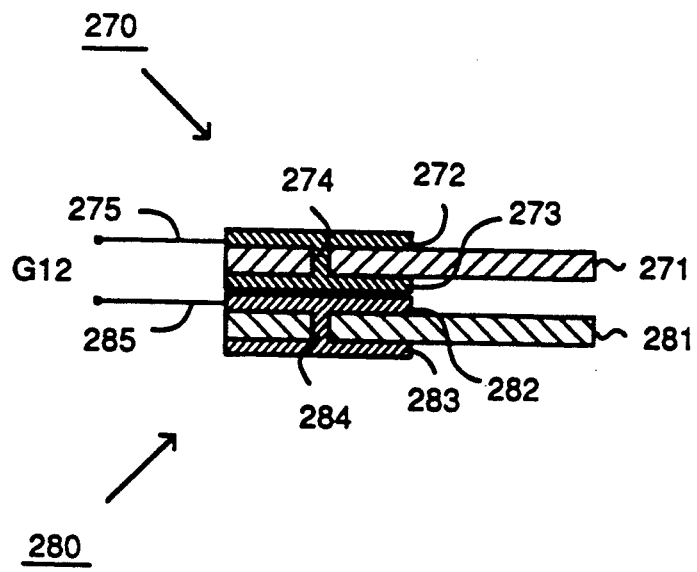
FIG. 17 sets forth a section view of a pair of sheets for use in a data entry book constructed in accordance with the present invention.

FIG. 17 sets forth sheet 270 overlying sheet 280. Sheet 280 exhibits structure which is similar to sheet 270 including insulative base 281 and conductive layers 282 and 283 on each face and an interconnection 284 therebetween. Schematically presented are tail 275, as an extension of sheet 270 and tail 285 as an extension of sheet 280. Tails 273 and 285 carry conductive layers (not shown but similar to those of FIGS. 1 and 3) for connection to external devices. In FIG. 17, sheets 270 and 280 are superimposed and conductive layer 273 of sheet 270 makes direct contact with conductive layer 282 of sheet 280. Accordingly, a significant conductance G12 can be measured between tails 275 and 285. Accordingly, when the sheets are open the conductance is zero. It will be apparent to those skilled in the art that using double side conductive layer sheets without insulating layers, such as sheets 270 and 280, in constructions described above, will achieve the same objective of the invention such as open sheets identification. Consequently, replacing the terms capacitance, zero capacitance and non-zero capacitance as used above by conductance, zero conductance and non-zero conductance, will specify the conditions for use of double sided conductive layer sheets without insulating layers.

Figure 18:
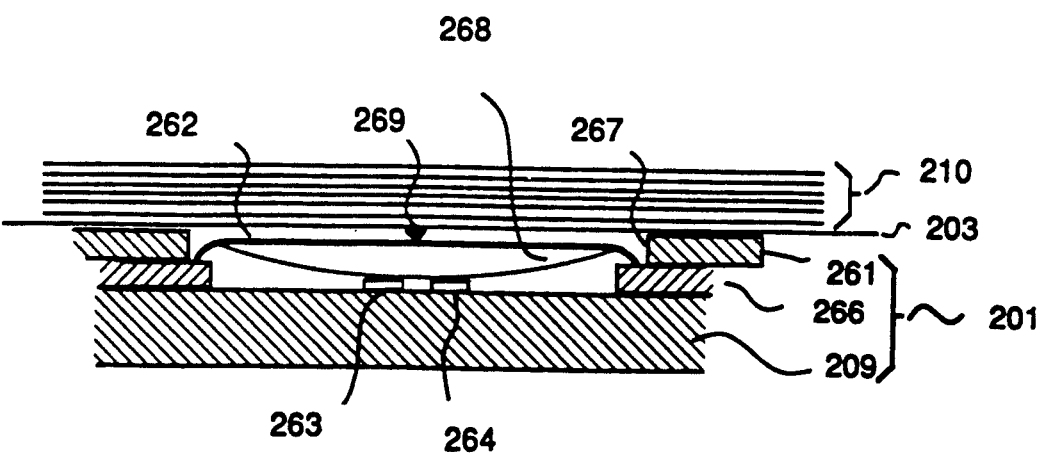
FIG. 18 sets forth a section view of portion of the present invention data entry book taken along section lines 18—18 in FIG. 15.

The relabelable keys, such as 100 in FIG. 5 and 265 in FIG. 15, are supported by a book cover or the like. To achieve a thin and partially flexible book cover, the present invention employs low profile flexible diaphragm membrane type keys. It will be apparent, however, that many alternative keys may be used in the present invention. FIG. 18 sets forth a section view of key 265 taken along section lines 18—18 in FIG. 15. Substrate 209 formed of an insulating material supports a pair of conductors 263 and 264. Insulating substrates 261 and 266 define an aperture 267 positioned above and centered upon conductors 263 and 264. A flexible contact 262 is made of an electrically conductive material and is shaped as a dome. In its normal/open position, contact 262 is spaced from conductors 263 and 264. A flexible cover 203 is supported upon substrate 261 and supports a downwardly extending projection 269. The thickness of substrate 261 is such that projection 269 is slightly distant from flexible contact 262. This levels flexible cover 203 and minimizes probability for unintentional key actuation. Label tablet 210 of FIG. 12 is supported upon cover 203 in accordance with the above-described structure. In the position shown in FIG. 18, no pressure is applied to key 265 and as a result flexible contact 262 remains spaced from contacts 263 and 264. However, if a downward force is applied by the operator to tablet 210 which in turn is transmitted to flexible cover 203 to force projection 269 against flexible contact 262. The downward flexing of cover 203 and contact 262 forces contact 262 downwardly (shown in dotted line 268) into contact with conductors 263 and 264 producing an electrical connection therebetween. When the force applied to label tablet 210 is released, the resilience of flexible contact 262 and flexible cover 203 return key 265 to the normal/open position.

What has been shown is a multipage data entry book capable of providing relabeling and reassignment of a plurality of keys operative within the data book. The data sheets within the data entry book are configured to provide a capacitive and/or conductive indication of the relative positions of the sheets within the data book at any given time. This information is then available to provide reassignment and relabeling information for the plurality of keys within the data entry book.

While particular embodiments of the invention have been shown and described, it will be obvious to those skilled in the art that changes and modifications may be made without departing from the invention in its broader aspects. Therefore the aim in the appended claims is to cover all such changes and modifications as fall within the true spirit and scope of the invention.

That which is claimed is:

1. For use in a book-like data entry device having a plurality of pageable data entry substrates for storing information in human readable visually observable form and capable of being opened to an open position exposing a selected data entry substrate, a pageable data entry substrate comprising:
   a base layer of insulative material having first and second opposed surfaces;
   a first electrically conductive element supported upon one of said surfaces of said base layer, said first electrically conductive element including an interactive portion for cooperation with other similar portions of data entry substrates to facilitate identification of the data entry substrate exposed in said open position; and
   substrate connection means for making electrical connection between said first electrically conductive element and said data entry device.

2. A data entry substrate as set forth in claim 1 wherein said base layer includes a planar sheet of insulating material defining said first and second surfaces and wherein said first conductive element defines a first layer of conductive material upon a portion of said first surface.

3. A data entry substrate as set forth in claim 2 wherein said substrate connection means includes a tail having a tail extension extending from said base layer and a path of conductive material extending from said first layer of conductive material across and upon said tail extension.

4. A data entry substrate as set forth in claim 3 wherein said tail extension is a wire bonded to said first electrical conductive element.

5. A data entry substrate as set forth in claim 4 further including an insulative layer covering said first electrically conductive element.

6. A data entry substrate as set forth in claim 2 wherein said second surface includes and supports a second-surface electrical conductive element.

7. A data entry substrate as set forth in claim 6 wherein said first electrical conductive element and second-surface conductive element are electrically connected to each other.

8. A data entry substrate as set forth in claim 5 wherein said substrate forms pockets for index card storage.

9. A data entry substrate as set forth in claim 5 wherein said substrate has means for receiving bookbinding means to cause it to operate as a pageable substrate.

10. A data entry book comprising:

a plurality of data sheets each including an insulative base layer, an electrically conductive element and tail extension for making an individual electrical connection to said conductive element;

a data book support for supporting said plurality of data sheets in a stacked array;

attachment means securing said plurality of data sheets to said data book support in a pageable arrangement such that said data sheets overlie each other in said stacked array and are pageable to open said book and form a first alternate stacked array and a second stacked array: and support connection means supported by said data book support establishing electrical connections to said tail extensions.

11. A data entry book as set forth in claim 10 wherein said respective electrically conductive elements of said data sheets have overlying portions producing a plurality of capacitances therebetween.

12. A data entry book as set forth in claim 11 wherein the capacitance between said conductive element of top data sheet of first alternate stacked array and said conductive element of top data sheet of second alternate stacked array is substantially less than those capacitances within the stacked arrays.

13. A data entry book as set forth in claim 12 wherein said data book support includes a planar support defining a support surface and wherein said support connection means include a plurality of connecting pads, conductors and electrical interface on said support surface.

14. A data entry book as set forth in claim 13 wherein said tail extensions define staggered lengths and wherein said connection pads are correspondingly spaced on said support surface.

15. A data entry book as set forth in claim 10 wherein said book support further includes a plurality of depressible keys.

16. A data entry book as set forth in claim 15 wherein said plurality of depressible keys are membrane keys supported beneath said data sheets and depressible therethrough.

17. A data entry book as set forth in claim 16 wherein said data entry sheets bear information labels and keypress indexes associated with said depressible keys.

18. A data entry book as set forth in claim 10 wherein said data sheet is divided into sheet sections, each sheet section is individually movable, and each said sheet section includes one said electrical conductive element and one said individual connection means to said electrical conductive element.

19. A data entry book as set forth in claim 14 further including at least one tailless data sheet free of external electrical connections interleaved between a selected pair of said data sheets having tail connections.

20. A data entry book as set forth in claim 14 further including at least one data sheet free of electrically conductive elements interleaved between a selected pair of said data sheets having tail connections.

21. A data entry book as set forth in claim 14 wherein said data book support includes and supports a tail protective cover.

22. A data entry book as set forth in claim 21 wherein said tail protective cover includes a plurality of extending support tabs and said data sheets each define a slot receiving a portion of said tail protective cover.

23. A data entry book as set forth in claim 14 wherein said support further includes at least one electrically conductive element.

24. A data entry book as set forth in claim 14 further including a split ring-binder mechanism supported by said support for receiving said substrates and facilitating the paging action of said substrates.

25. A data entry book as set forth in claim 14 wherein at least one of said substrates in said first and second stacked arrays is accessible for human touch introducing body capacitance and resistance measurable at said electrical interface.

26. A data entry tablet comprising:

a plurality of data sheets each including an insulative base layer having extending tail portions, a conductive area including a portion extending across said tail portion; and binding means maintaining said data sheets in a stacked array such that said tail portions extend in a common direction.

27. A data entry tablet forth in claim 26 wherein said base layers define a common edge and wherein said tail portions of each of said base sheets extend from said common edge thereof.

28. A data entry tablet as set forth in claim 27 wherein said tail portions of said data sheets form a stacked array and are staggered in length.

29. A data entry tablet as set forth in claim 28 wherein said binding means include a clamp secured to said plurality of data sheets along said common edge.

30. A data entry tablet support for use in supporting a plurality of data entry sheets each of said data entry sheets including an edge and an extending connection tail, said tablet support comprising:

a base defining a planar support surface;

a cover member hingeably attached to said base and movable between an open position away from said support surface and a closed position overlying said support surface to captivate data entry sheets in a compressive clamp attachment along said edges therebetween;

a plurality of electrical connecting pads supported upon said support surface positioned in alignment with said connection tails; and connection means for making electrical connection to said connecting pads including means for captivating said connection tails against said connecting pads when said cover member is in said closed position.

31. A data entry tablet support as set forth in claim 30 wherein said connecting pads are arranged in rows beneath said cover member.

32. A data entry tablet as set forth in claim 31 wherein said support surface defines a tablet area which data entry sheets overlie when supported by said tablet support and an outside area adjacent said tablet area.

33. A data entry tablet support as set forth in claim 32 further including a first plurality of depressible keys supported within said tablet area and depressible through the data entry sheets.

34. A data entry tablet support as set forth in claim 33 further including a second plurality of keys supported upon said support surface within said outside area.

35. For use in entering data into an information system, a data entry book comprising:

a plurality of insulative data sheets;

a plurality of conductive elements supported upon said data sheets;

means for supporting said data sheets in a stacked array in which said conductive elements generally overlie each other, said data sheets being pageable from said stacked array to open said data entry book to a selected data sheet; and connecting means for making electrical connection to said conductive elements, whereby the open sheet in said stacked array may be determined by sensing the electrical properties between said conductive elements.

36. A data entry book as set forth in claim 35 wherein the electrical property sensed to determine the open sheet is capacitance.

37. A data entry book as set forth in claim 35 wherein the electrical property sensed to determine the open sheet is electrical conductance.

38. For use in an electronic data entry device, at least two writable and printable data substrates, movable to a first operative position at least partially overlying each other and a second operative position at least partially removed from each other, each substrate comprising:
   a base layer of insulative material;
   a first electrical element supported upon said base layer.

39. For use in an electronic data entry device as set forth in claim 38 wherein said data substrates each includes a connection means for making electrical connection between said first electrical element and an external element.

40. For use in an electronic data entry device as set forth in claim 39 wherein said base layer includes planar substrate of insulating material defining first and second surfaces and wherein said first electrical element defines a first layer of conductive material upon a portion of said first surface.

41. For use in an electronic data entry device as set forth in claim 40 wherein said connection means includes a tail having a tail extension extending from said base layer and a path of conductive material extending from said first layer of conductive material across and upon said tail extension.

42. For use in an electronic data entry device as set forth in claim 41 wherein said connection means is wire.

43. For use in an electronic data entry device as set forth in claim 38 further including multiple electrical elements supported upon said base layer.

44. For use in an electronic data entry device as set forth in claim 43 further including connection means for making electrical connections between said multiple electrical elements and external elements.

45. For use in an electronic data entry device as set forth in claim 44 further including an insulative layer covering said first electrical element and said multiple electrical elements.

46. For use in an electronic data entry device as set forth in claim 40 wherein said second surface supports a second-surface electrical element.

47. For use in an electronic data entry device as set forth in claim 46 wherein said first electrical element and said second-surface electrical element are electrically connected to each other.

48. For use in an electronic data entry device as set forth in claim 47 further including an insulative layer covering said first electrical element and said second-surface electrical element.

* * * * *